United States Patent [19]

Heeren

[11] Patent Number: 5,321,437
[45] Date of Patent: Jun. 14, 1994

[54] PRINTING DEVICE

[75] Inventor: Theodorus A. G. Heeren, Venlo, Netherlands

[73] Assignee: Oce-Nederland B.V., Venlo, Netherlands

[21] Appl. No.: 782,630

[22] Filed: Oct. 25, 1991

[30] Foreign Application Priority Data

Oct. 26, 1990 [NL] Netherlands .................... 9002338

[51] Int. Cl.$^5$ ................. G01D 15/06; G03G 21/00
[52] U.S. Cl. ................................. 346/153; 355/316; 355/317
[58] Field of Search ............... 355/316, 317; 346/155

[56] References Cited

U.S. PATENT DOCUMENTS

| | | | |
|---|---|---|---|
| 3,876,300 | 4/1975 | Washio et al. ................. 355/317 |
| 4,372,676 | 2/1983 | Miyata et al. ................. 355/313 X |
| 4,541,709 | 9/1985 | Kampschreur . | |
| 4,711,552 | 12/1987 | Nilsson et al. ................. 355/316 |
| 4,745,435 | 5/1988 | Sakata et al. ................. 355/316 |
| 4,931,876 | 6/1990 | Hashizume ................. 346/155 X |
| 4,956,651 | 9/1990 | Emori ................. 355/316 |
| 4,962,404 | 10/1990 | Wakikaido et al. ................. 355/317 X |
| 5,021,835 | 6/1991 | Johnson ................. 355/317 X |
| 5,036,354 | 7/1991 | Miyamoto ................. 355/317 X |
| 5,130,724 | 7/1992 | Crowley ................. 355/316 X |
| 5,134,427 | 7/1992 | Akiyama et al. ................. 355/317 X |

FOREIGN PATENT DOCUMENTS

| | | |
|---|---|---|
| 86/02623 | 5/1986 | European Pat. Off. . |
| 55-43536 | 3/1980 | Japan . |
| 56-85763 | 7/1981 | Japan ................. 355/204 |

Primary Examiner—George H. Miller, Jr.
Attorney, Agent, or Firm—Birch, Stewart, Kolasch & Birch

[57] ABSTRACT

A printing device and a method thereof in which image data is fed to an image forming device to form an image on a photoconductive drum moving at substantially a constant speed, the image being developed and transferred to a receiving sheet, wherein a synchronization value is derived from the displacement of the receiving sheet during image transfer and the supply of image data to the image forming device is controlled by means of the synchronization value.

7 Claims, 3 Drawing Sheets

PRINTING DEVICE

BACKGROUND OF THE INVENTION

1. Field of the Invention

The present invention relates to an imaging system and more specifically to a method and device for developing and transferring an image in an image recording device.

2. Discussion of Related Art

A device is known as described in Japanese Publication 55/43536, in which the circumferential speed of a photoconductive drum is detected and in which the supply of data to a laser scan module is controlled in connection with the drum speed. The speed of the receiving sheet to which a toner image is transferred is also controlled on the basis of the detected circumferential speed of the drum near the image transfer station. Although in this way a correction is made for the photoconductive drum being out of round, various kinds of unwanted effects occur, nevertheless, particularly at the transfer station to prevent accurately synchronized image transfer. For example, the receiving sheet, which is fed on a belt, will generally always experience some slippage in the transfer zone, thus resulting in image distortion. In addition, if the image is transferred to a thick receiving sheet, the surface speed of that sheet in the transfer zone will be greater than that of a thin receiving sheet. Particularly in the case of printing devices used in drawing offices, it is a requirement that a print on a receiving sheet differ very little from the original. The length of the image on the copy may deviate only by 0.3% at a maximum. This requirement applies to all kinds of receiving sheets processed in the printing device, in formats A0 to A4, thicknesses of from 0.06 to 0.25 mm, transparent films, and so forth. In order to satisfy this very high requirement for a 1:1 image, some known printing devices comprise a control element which can be adjusted by the operator by means of which, for example, the speed of the receiving material can be adjusted by means of a fine control. To this end, the operator measures the dimensions of the resulting image on the printed medium and compares them with the dimensions of the original. This operation must be repeated for the subsequent prints until an exact 1:1 image is obtained.

Satisfying this high imaging accuracy becomes even more difficult if use is made of transfer devices of the kind described, for example, in U.S. Pat. No. 4,541,709. Therein, the powder image on a photoconductive belt is first transferred to an intermediate member such as a belt having a top layer of silicone rubber. This belt is heated and the toner image thus softened is transferred to a receiving sheet. Accordingly, the top layer is pressed in somewhat as a result of the pressure at the contact surface of the intermediate member and the photoconductive belt, so that the toner image transferred to the intermediate member is some percent longer than the original image. An opposite effect occurs on transfer to the receiving sheet, but complete compensation does not occur owing to the differences in pressure between the two contact surfaces. The image deformation (image lengthening or shortening) is, to a high degree, pressure-dependent. For example, on transfer to a thick receiving sheet the deformation will be different from that occurring in the case of transfer to a thin receiving sheet. The same kind of variation occurs on transfer to a large format (A0) or a small format (A4) receiving sheet.

Another disadvantage of the known systems is that the transfer rollers and the like exhibit some degree of wear during their life and thus decrease in thickness. This, in turn, has the effect that for an originally, correctly adjusted speed of rotation, the circumferential speed of the rollers decreases, so that, for example, the receiving sheets are supplied at a reduced speed, so that there is again a deformation of the transferred image.

SUMMARY OF THE INVENTION

Therefore, it is an object of the present invention to provide a printing device which will overcome the above noted disadvantages.

It is a further object of the present invention to provide an imaging process whereby an image is formed, developed and transferred in synchronization.

Still a further object of the present invention is to provide a printing device which can affect accurately synchronized image transfer. The foregoing objects and others are accomplished in accordance with the present invention, generally speaking, by providing a system whereby image data is fed to an image forming device to form an image on an image forming medium moving at substantially a constant speed, this image being developed and transferred to a receiving sheet also moving at substantially a constant speed.

In such a system at least one synchronization value is derived from the displacement of the receiving sheet during image transfer and the supply of image data to the image forming device is controlled by means of this at least one synchronization value. The printing device according to the present invention comprises a means for determining the displacement of the receiving sheet during at least a part of the image transfer, a means for deriving at least one synchronization value therefrom, and a means whereby the supply of image data to the image forming device is controlled by means of the synchronization value. As a result, accurate synchronization is always obtained, controlled by the medium (the receiving sheet) on which the accurate imaging is required. This imaging accuracy is independent of any deformation occurring during the use of an intermediate member.

In an alternate method according to the present invention for synchronized image transfer to receiving sheets having different dimensions or properties, an associated synchronization value is derived and stored in a memory. As a result, an accurate 1:1 print is obtained for each receiving sheet without an operator being required to take any particular action.

BRIEF DESCRIPTION OF THE DRAWINGS

The invention will be further explained in detail with reference to the accompanying drawings, wherein.

DETAILED DESCRIPTION OF THE INVENTION

Figure 1:
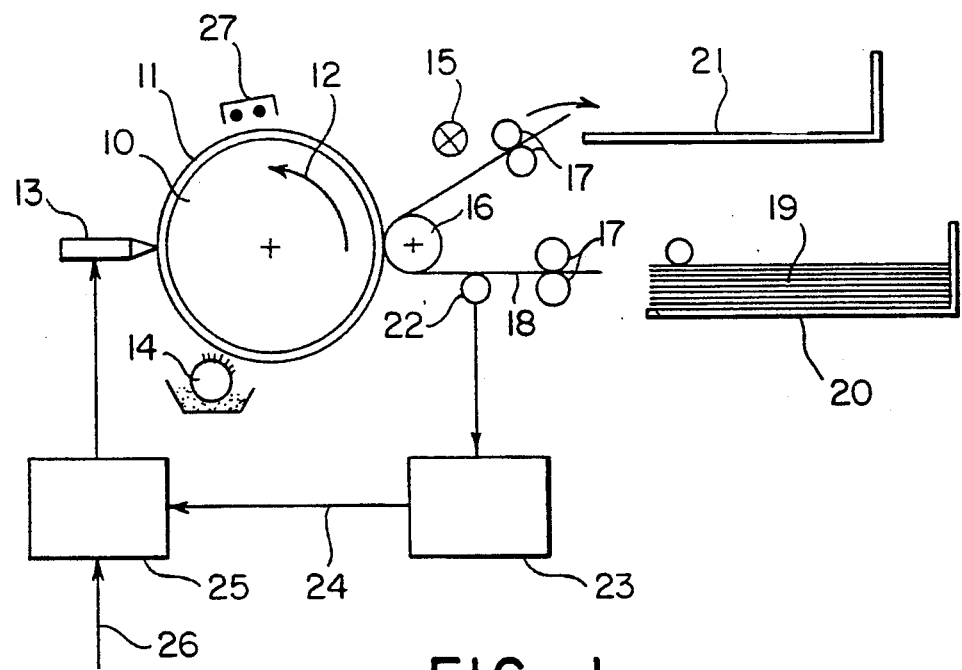
FIG. 1 represents a printing device according to the present invention.

Referring now to FIG. 1 there is seen a printing device comprising a drum 10 provided with a photoconductive layer 11 rotated by means of a motor (not shown) at substantially a constant speed in the direction of arrow 12. The layer 11 is provided with a uniform electric charge by means of a corona device 27 and is then exposed imagewise, line-by-line, by an image forming device 13, which is shown herein in the form of a LED array which extends parallel to the axis of rotation of the drum 10. The electrostatic latent image formed on the photoconductive drum 10 as a result of exposure to the image forming device 13 is developed imagewise with a toner material by means of the developing device 14 and the resulting toner image is transferred to a receiving sheet 18 fed past the photoconductive drum at substantially a constant speed by the transfer device 16.

The receiving sheet 18 is fed from a tray 20 containing a stack of receiving sheets 19 between rollers 17, and is deposited in a collecting tray 21. Before the receiving sheet is deposited in the collecting tray 21 the toner image is fused on the sheet by means of the fusing device 15.

The transfer device 16 is herein represented as comprising a metal roller to which can be applied a voltage adapted to transfer the toner powder image from the photoconductive layer 11 to the receiving sheet 18. The roller is driven by a motor (not shown) at a speed substantially equivalent to the speed of the drum 10 which is applied against the roller with some pressure. The receiving sheet 18 thus passes through the rollers 17 at a speed which is substantially equivalent to the circumferential speed of the drum 10. A device for determining the displacement of the receiving sheet 18 comprises a pick-up 22 which detects the linear displacement of the receiving sheet 18 during a period when the receiving sheet 18 is situated in the transfer device 16.

Pick-up 22 is a very wear-resistant roller made of tungsten carbide, which makes non-slip contact with the receiving sheet 18 and which is provided with a calibrated disc. On displacement of the receiving sheet 18 over a distance of exactly 100.0 mm, the disc performs one complete revolution and delivers one pulse to a circuit 23 which derives a synchronization value therefrom. This synchronization value is a measurement of the line frequency at which the image data 26 must be fed to the LED array. Assuming, for example, that an image is to be depicted on the receiving sheet with a resolution of 10 lines per mm, if the receiving sheet travels a distance of 100.0 mm in exactly 1 second, the time required for a displacement over one line spacing is equal to 1 msec. This means that a pulse must be fed to circuit 25 every 1 msec, whereupon circuit 25 feeds, from the supplied image data, a complete line of image data to the LED array 13 every 1 msec.

If the receiving sheet were to cover the distance of 100.0 mm in 1.10 second, the time required for a displacement over 1 line spacing is equal to 1.10 msec and this means that a pulse must be fed to circuit 25 every 1.10 msec, circuit 25 feeding a complete line of image data to the LED array every 1.10 msec from the image data supplied. The actual speed of revolution of the drum 10 is unimportant to form an exact 1:1 image on the receiving sheet. The only important feature is that the drum be moved at substantially a constant speed, as is the receiving sheet.

Since, in a device as shown diagrammatically in FIG. 1, an image must first be formed over approximately half the circumference of the drum 10 before a toner image can be transferred to the receiving sheet 18, a delayed control system is preferably used, in which, during transfer to a first receiving sheet, a synchronization value is derived from the linear displacement of the receiving sheet and the value is stored in a memory. This stored synchronization value is now fed to circuit 25 during the supply of image data of a second image to be formed to the LED array 13, so that the formation of the second image is controlled by the synchronization value obtained during the printing of the preceding image. During the transfer of this second image to a second receiving sheet a new synchronization value is derived from the linear displacement of the second receiving sheet, and this synchronization value is now stored in the memory, so that it can control the image data supply of a third image. Since this second synchronization value will differ only very little from the first synchronization value, and since the speed of the drum and the speed of the receiving sheets are kept constant, a good synchronization and 1:1 imaging will be maintained.

During the life of the printing device, the roller in the transfer device 16 will, for example, wear to some extent, so that the speed of displacement of the receiving sheet 18 will decrease. This means that an increasingly higher synchronization value will be derived and the supply of image data to the LED array will always be slower, so that the 1:1 ratio is accurately maintained. The fact that a synchronization value is always derived anew makes any new adjustment or re-adjustment by an operator or service engineer unnecessary.

Figure 2:
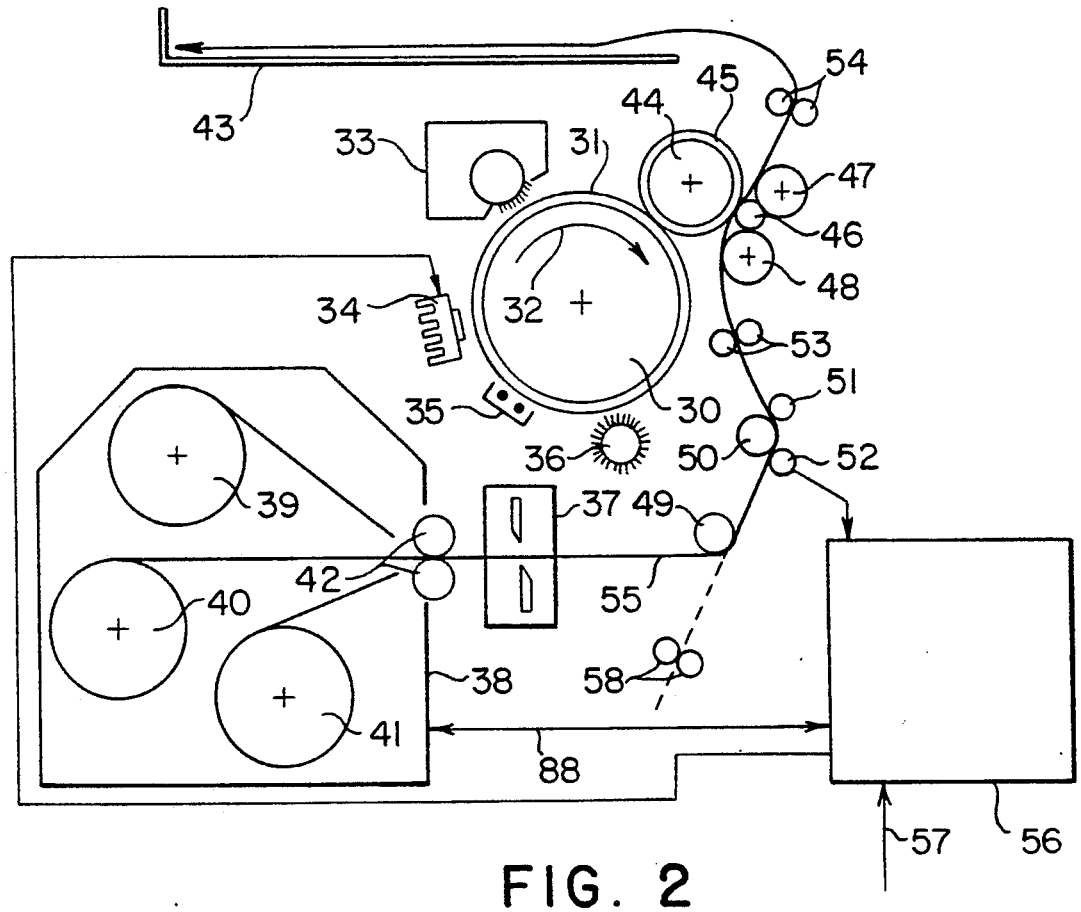
FIG. 2 is another representation of an embodiment of a printing device according to the present invention, FIG. 3 diagrammatically illustrates an electronic circuit for a printing device according to the present invention.

FIG. 2 represents another printing device of the present invention. A drum 30, provided with a photoconductive layer 31, is rotated by means of a motor (not shown) at a substantially constant speed in the direction of arrow 32. The layer 31 is provided with a uniform electric charge by means of a corona device 35 and is then exposed imagewise, line-by-line, by the image forming device, which is herein shown in the form of an LED array 34 extending parallel to the axis of rotation of the drum 30. The latent image obtained from exposure is developed by a toner material by means of developing device 33 and the toner image is transferred to a receiving sheet fed past in the transfer device 44-48 at substantially a constant speed.

The transfer device comprises a roller 44 provided with a top layer 45 of silicone rubber. The toner image is received by the silicone rubber 45 from the drum 30 and, since roller 44 is heated, the toner image will be fed in a somewhat softened state to a transfer zone between roller 44 and a biasing roller 46. A receiving sheet is now fed between the two rollers 44, 46 and the softened toner image will be transferred to the receiving sheet and cooled to give a permanent toner image. The rollers 47 and 48 are operative to protect the relatively thin biasing roller 46 against deflection.

The printing device has a roll dispenser 38 in which three rolls of receiving material 39, 40, and 41 are disposed in such a manner that one of the rolls 39, 40, or 41 is selected at any time in response to an input command via a control panel. The rolls may contain receiving materials which differ from one another in respect of width and thickness or other properties. For example, roll 39 may contain paper of a width of about 30 cm, roll 40 paper of a width of about 60 cm and roll 41 paper of a width of about 80 cm. In FIG. 2 roll 40 has been selected and the path travelled by the web of paper through the printing device is denoted by line 55. The web of paper can be cut off my means of knife 37 to give A1 size sheets, for example. The web of paper from roll 40 is fed via tensioning rollers 42, knife 37 and roller 49 between rollers 50, 51 and 53 to the transfer device 44–48 and then deposited in the sheet receiving device 43 via rollers 54. Pick-up 52 makes non-slip contact with the paper web opposite roller 50 and detects the linear displacement of a receiving sheet passing through, as described for FIG. 1. The detection signal 88 is fed to a circuit 56 and from this a synchronization value is derived to control the supply of image data 57 to the LED array 34.

It has been found in practice that a different linear speed of displacement occurs for each separate width of the receiving sheet using the above printing device. This is probably due to non-uniform wear of biasing rollers 44 or 46, so that a somewhat different slip occurs with different formats. Differences in thickness between the receiving sheets from the rolls 39, 40 and 41 also result in differences in speed of displacement as a result of the pressure changing between rollers 44 and 46 in consequence. In order that an exact 1:1 image may be obtained on any receiving material, however, a separate synchronization value is derived for each type of receiving material and stored in a memory in circuit 56, together with an indication of the material, e.g. the position of the material on one of the rolls 39, 40 and 41. One of the receiving material rolls 39, 40, or 41 is selected by the operator during printing, or else such selection may be automatic, in dependence on the size of the original to be printed. At the same time, the last determined synchronization value associated with that roll is called up from the memory and the flow of image data controlled therewith.

In the device according to FIG. 2, any desired kind of receiving sheet can be supplied via rollers 58. By way of the control panel the operator inputs a code for the sheet fed in. If a receiving sheet of this type has already previously been processed by the device, a synchronization value for that material is already stored in the memory and the image formation on drum 30 is synchronized therewith. If the material has not been used previously, then a synchronization value is allocated during the inputting of a code for the same. During printing on this material, a synchronization value is again derived and stored with the associated code in the memory, so that the next print on the same material gives an exact 1:1 image.

Figure 3:
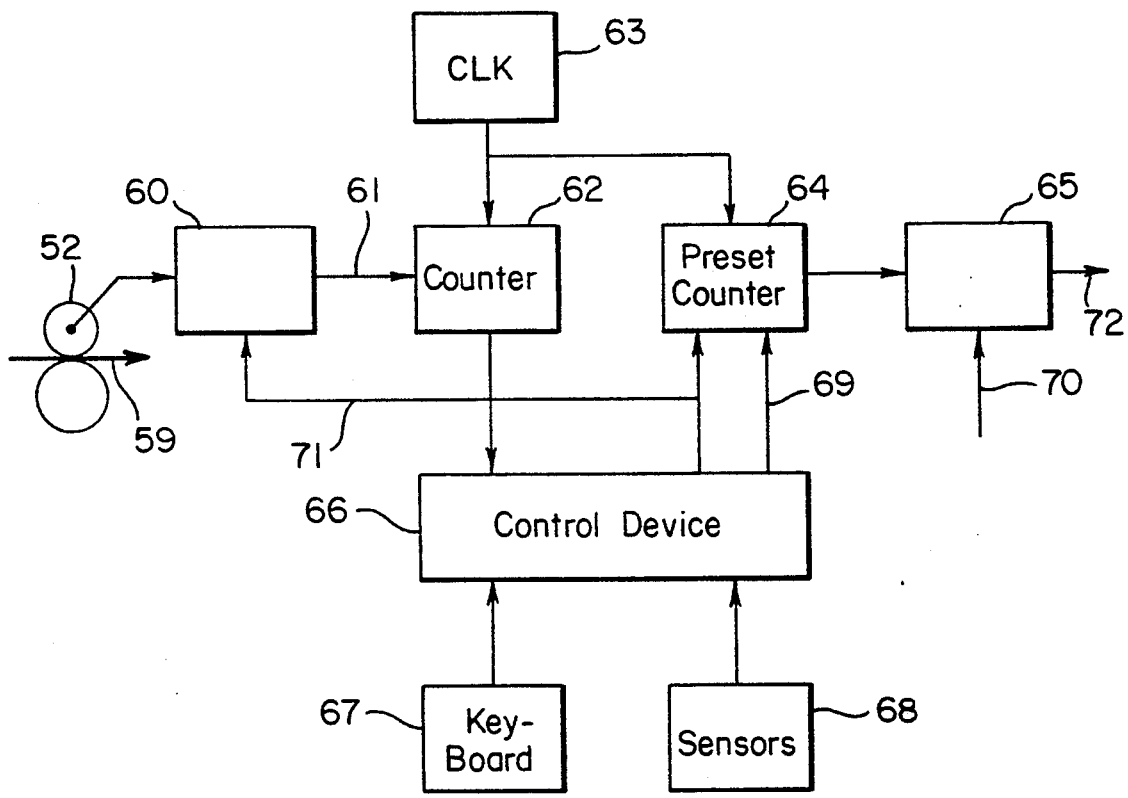

FIG. 3 is a diagram showing an electronic circuit for a printing device according to the present invention. A tungsten carbide roller 52 having a rough surface is pressed against a receiving sheet 59 and measures the displacement thereof, which is transmitted to a revolution pick-up 60. Roller 52 has a circumference of 100 mm. In response to a signal from the control device 66 fed via line 71 to the pick-up 60, the latter delivers a first pulse to a flip-flop when the roller 52 is in a specific position. The output of this flip-flop thus goes high. When the roller 52 has performed exactly one revolution and the receiving sheet 59 has thus moved over a distance of 100 mm, the revolution pick-up 60 delivers a second pulse to the flip-flop, so that the output 61 again goes low. This output signal from the flip-flop is used as an enable signal for a counter 62. During the time that this enable signal is high on output 61, counter 62 counts the number of pulses fed by a 1 MHz clock pulse generator 63 to counter 62. If the enable-signal is exactly 1 sec high, the counter 62 will have counted $1 \times 10^6$ pulses. Given a required resolution of 10 lines per mm, i.e. a line spacing of 0.1 mm, the number of pulses generated on displacement of the receiving sheet over one line spacing is equal to 1000.

The count of counter 62 is divided by 1000 in the control device 66 to give the synchronization value. In the example described this value is 1000. This synchronization value is stored in a memory in the control device 66 together with a code for the type of receiving sheet being used. As described above, this code can be input by the operator via a keyboard 67, or automatically via sensors 68 disposed at the stock rolls of receiving material.

The synchronization value is then fed as a pre-set value to a pre-settable counter 64. This counter 64 is fed with the same clock pulses from clock pulse generator 63 as are fed to counter 62. In the example described counter 64 is pre-set to 1000. After exactly 1000 clock pulses have been fed to counter 64 the latter delivers a synchronization pulse to circuit 65 which comprises a serial-in, parallel-out shift register in which exactly one image line of image data fed via 70 is stored. The synchronization pulse starts the parallel output of image data via lines 72 to the image forming device. After counter 62 has delivered a synchronization pulse, counter 64 is again pre-set to 1000 and the cycle is repeated until a complete image has been printed on the receiving sheet.

The circuit described above is intended only as an example and can be implemented in many other ways, for example, depending on the displacement pick-up used, or on the image forming device, which can be controlled in parallel or in series. Of course a microcomputer can be used for this circuit.

Figure 4:
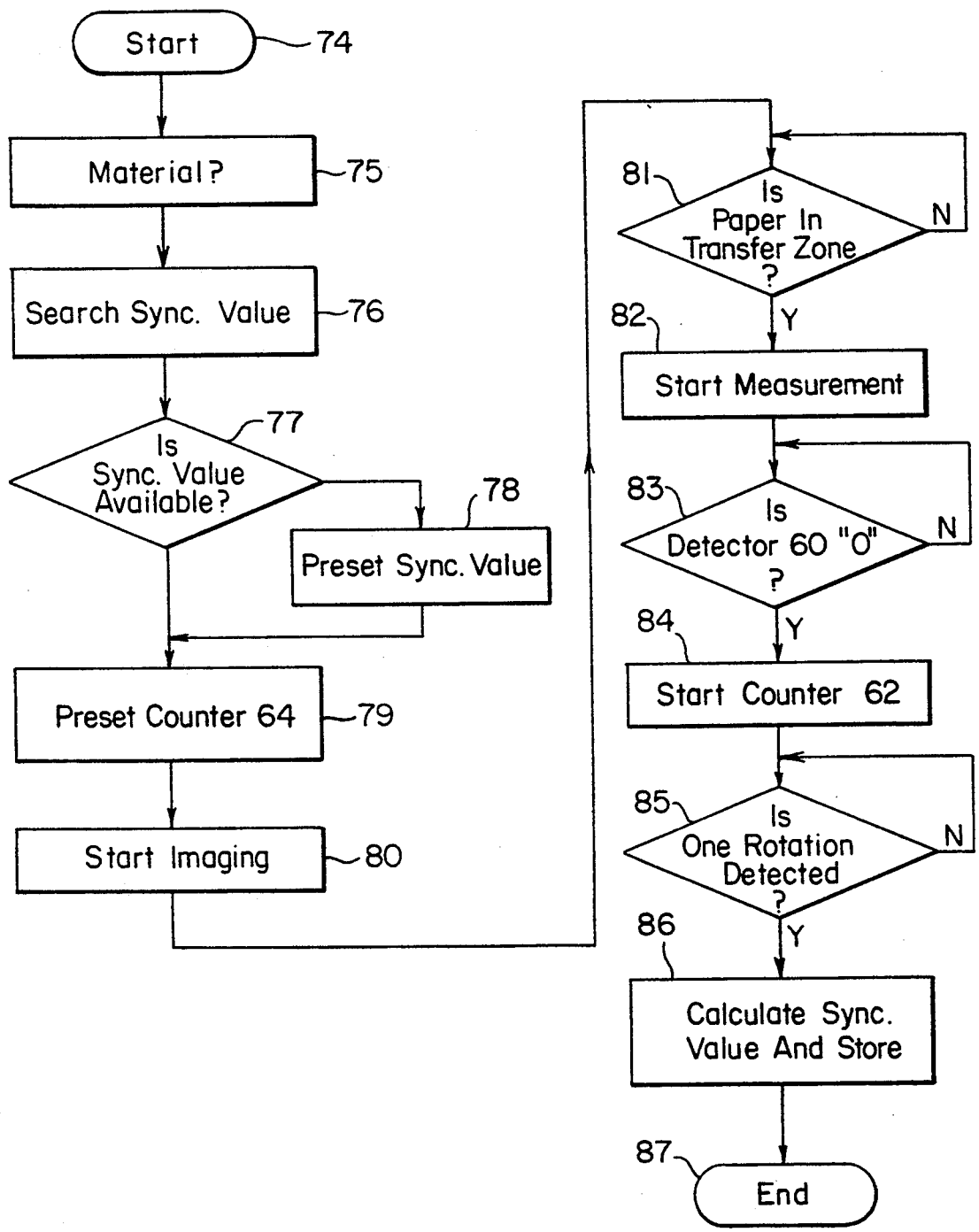
FIG. 4 is a flow diagram of a method according to the present invention.

FIG. 4 represents a flow-chart of a possible print cycle of the kind that can be carried out by means of a microcomputer. After the start 74 of the printing device, step 75 searches the material, the type and/or format of the receiving sheet on which a print is to be made. This can be done automatically via sensors at the roll device or, as described above, be input by the operator via a control panel. If paper cassettes are used, the input can be carried out via known methods as a detection of marks or the like.

The associated synchronization value is searched in step 76 in a memory table. Step 77 checks whether this value is present and, if so, the program goes on to step 79. If there is no associated synchronization value present, a provisional synchronization value is allocated in step 78. This can be done in various ways, e.g. by always selecting a fixed value, but preferably a value is generated which is equal to the average of all the synchronization values present in the memory. In step 79 the synchronization value is fed as a pre-set value to counter 64. Image formation can be started in step 80. After image formation has started, step 81 determines the moment at which a receiving sheet is present in the image transfer zone by repeatedly scanning a sensor present there. If a sheet is present, the measuring cycle is started in step 82. In step 83 the revolution pick-up 60 is accessed to determine the first zero position, whereon counter 62 is started in step 84. In step 85 the pick-up is always accessed again to determine the moment at which the pick-up disc has completed exactly one revolution. When this moment has been detected, the synchronization value is determined in step 86 in the manner described above from the count of counter 62 and stored in the memory in a table at the code of the material input in step 75. The program described is terminated in step 87.

In the above description it has always been assumed that the drive for both the image forming medium and for the receiving sheet remains substantially constant and that only a very slow change occurs between the two speeds as a result of wear during the life of the printing device. However, the invention can also be practiced if the receiving sheet does not pass through the transfer device with a constant displacement per unit of time during the image transfer. A situation of this kind can occur if the pressure between the transfer rollers is so great that a receiving sheet passing therethrough causes a considerable change in the speed of transit. Such a change may also occur if the receiving sheets used have a thickened binder edge at the leading or trailing edge.

In these cases, a different displacement pickup can be used which delivers a pulse on each displacement of the receiving sheet over a distance equivalent to the distance between two image lines to be printed. The counter 62 in FIG. 3 then always counts the number of clock pulses from the clock pulse generator 63 occurring in each period between two image lines. A synchronization value is derived from each of these values in the manner described above and all these synchronization values derived for all the image lines of a complete receiving sheet are stored in the memory. When a print is made on an identical following receiving sheet all these stored synchronization values are fed, in the manner described above, successively as a pre-set value for the counter 64 to the latter and each time the number of clock pulses supplied corresponds to the pre-set value a synchronization pulse is delivered to circuit 65, after which a following synchronization value is fed to the counter 64 as a pre-set value. In this way an exact 1:1 image is obtained in those cases in which the speed of the receiving sheet does not remain constant during image transfer.

The invention has been described with reference to an electrophotographic printing device in which image formation is effected by means of an LED array, but any other exposure device may be used, e.g. a laser or an array of switchable light valves. The invention can be used in all systems in which an image is depicted on a medium other than the receiving sheet and then transferred to a receiving sheet. Thus the invention can be used in those systems in which a latent electrostatic image is first transferred to an intermediate and developed and then transferred from the intermediate to a receiving sheet. The invention can also be used correspondingly in a magnetographic system in which image formation is carried out by means of a number of magnet heads on a magnetizable drum and in which the magnetic image is developed and transferred to a receiving sheet.

In addition to the 1:1 imaging described, any other fixed imaging ratio can be obtained according to the invention, for example, by dividing or multiplying the determined synchronization value by an enlargement factor. If, for example, a synchronization value of 1000 is determined and a value of 1000:2=500 is supplied in FIG. 3, then image formation will take place at a double frequency and a print having exactly half the size of the original as considered in the direction of sheet transport will be obtained on the receiving sheet.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An imaging method comprising feeding image data to an image forming means so as to form an electrostatic latent image on an image forming medium, said image forming medium being moved at substantially a constant speed, developing said latent image with toner to form a toner image, transferring said toner image to a receiving sheet moving at substantially a constant speed, and deriving at least one synchronization value from a displacement of said receiving sheet during image transfer, whereby said image data supply to said image forming means is controlled by means of said synchronization value.

2. A method according to claim 1, wherein said at least one synchronization value is stored in a memory and image data for a subsequent receiving sheet is controlled by said at least one synchronization value.

3. A method according to claim 2, wherein at least one associated synchronization value is derived for each receiving sheet of different dimensions or properties, and is stored in a memory.

4. A method according to claim 2, wherein a number of synchronization values corresponding to a number of image lines to be printed is derived for a receiving sheet.

5. A printing device comprising an image forming means, means by which image data is supplied to said image forming means, an image forming medium moving at substantially a constant speed on which a latent image is formed by said image forming means, a developing device for developing said latent image with toner, a transfer means whereby said developed toner image is transferred to a receiving sheet moving at substantially a constant speed, means for determining displacement of said receiving sheet during at least a part of said image transfer, means for deriving at least one synchronization value therefrom, and a means whereby supply of said image data to said image forming means is controlled by said synchronization value.

6. A printing device according to claim 5, further including a memory means for storage of synchronization values for receiving sheets having different dimensions or properties.

7. A printing device according to claim 5, wherein said image forming means comprises a LED array and said image forming medium comprises a photoconductive substrate.

* * * * *